UNITED STATES PATENT OFFICE.

GRACE COCKRELL, OF NIAGARA FALLS, NEW YORK.

BREAKFAST FOOD.

1,244,586.

Specification of Letters Patent.

Patented Oct. 30, 1917.

No Drawing.

Application filed February 23, 1917. Serial No. 150,627.

*To all whom it may concern:*

Be it known that I, GRACE COCKRELL, a resident of Niagara Falls, in the county of Niagara and State of New York, have invented a Breakfast Food, of which the following is a specification.

This invention relates to an improved food compound which is intended for use as a breakfast porridge.

The object of the invention is to produce a palatable, nutritious, laxative breakfast food.

In preparing my improved food I use clean sterilized wheat bran, corn meal, finely ground oats, and a very coarse whole wheat flour, the proportions of each being about sixty per cent. wheat bran, fifteen per cent. corn meal, fifteen per cent. wheat flour, ten per cent. ground oats. These cereals are heated in an oven until slightly browned, thereby destroying all germs, and adding much to the flavor; they are then thoroughly mixed into a food and are to be put into cartons and hermetically sealed ready for the market.

As is well known bran is an excellent laxative and when blended with the other cereals it is a very palatable food, the corn, wheat, and oats contain the protein, fats, and carbohydrates necessary for building up and maintaining the human body. This food is especially beneficial for people suffering from constipation and indigestion. It is an excellent food for growing children, keeping their bowels in a natural healthy condition, and for the older ones who are in a rundown condition.

I claim:

A cereal food consisting of about twelve parts bran, three parts corn meal, three parts wheat, and two parts oats.

MRS. GRACE COCKRELL.

Witnesses:
 ARTHUR BATTS,
 MABEL B. BATTS.